United States Patent [19]

Tietze et al.

[11] Patent Number: 4,708,196

[45] Date of Patent: Nov. 24, 1987

[54] SHAFT COOLER FOR THE DRY QUENCHING OF COKE

[76] Inventors: Jurgen Tietze, Universitässtrasse 83; Wilhelm Danguillier, Friederikastrasse 88; Heinz Thubeaville, Ministerstrasse 18; Siegfried Pohl, Am Dornbusch 13, all of 4630 Bochum; Friedrich Müller, Hauptstrasse 224, 4690 Herne 2, all of Fed. Rep. of Germany

[21] Appl. No.: 604,653

[22] PCT Filed: Jul. 22, 1983

[86] PCT No.: PCT/DE83/00128

§ 371 Date: Mar. 23, 1984

§ 102(e) Date: Mar. 23, 1984

[87] PCT Pub. No.: WO84/00557

PCT Pub. Date: Feb. 16, 1984

[30] Foreign Application Priority Data

Jul. 29, 1982 [DE] Fed. Rep. of Germany ....... 3228291
Mar. 18, 1983 [DE] Fed. Rep. of Germany ....... 3309695

[51] Int. Cl.[4] .......................................... C10B 39/00
[52] U.S. Cl. ..................................... 165/47; 165/142; 34/20; 34/168; 201/39; 202/228; 432/79; 432/238
[58] Field of Search ............... 34/10, 20, 168; 165/47, 165/142; 432/79, 238; 201/39; 202/227, 228, 268, 251, 223

[56] References Cited

U.S. PATENT DOCUMENTS

| | | | |
|---|---|---|---|
| 566,106 | 8/1896 | Wingard | 432/79 |
| 2,100,758 | 11/1937 | Ackeren | 202/251 |
| 3,088,722 | 5/1963 | Slesaczek | 432/238 |
| 4,315,620 | 2/1982 | Megerle et al. | 266/193 |
| 4,342,626 | 8/1982 | Jakobi et al. | 202/228 |
| 4,370,202 | 1/1983 | Weber et al. | 201/39 |
| 4,398,999 | 8/1983 | van Laar et al. | 432/238 |
| 4,437,936 | 3/1984 | Jung | 202/228 |
| 4,438,571 | 3/1984 | Jakobi | 34/20 |

FOREIGN PATENT DOCUMENTS

| | | | |
|---|---|---|---|
| 653798 | 12/1962 | Canada | 432/238 |
| 0060972 | 9/1982 | European Pat. Off. | 202/227 |
| 803457 | 10/1958 | United Kingdom | 432/238 |
| 1061412 | 3/1967 | United Kingdom | 202/228 |

Primary Examiner—Albert W. Davis, Jr.
Assistant Examiner—John K. Ford
Attorney, Agent, or Firm—Thomas H. Murray; Clifford A. Poff

[57] ABSTRACT

A shaft cooler for dry quenching of coke includes an inner masonry ring that is an independent structure suspended on the top edge of the outer masonry of the shaft cooler. The weight of the inner masonry ring is carried by stays which bear on the top edge of the outer masonry. The tubular stays are disposed in one embodiment inside the masonry ring and in another embodiment outside the masonry ring. The tubular stays are connected to ring mains for conducting a coolant medium. When the tubular stays are disposed outside the masonry ring, parallel tubes are interconnected along their entire length by webs to form a closed steel ring. Ring tubes are welded to the top and bottom ends to serve as a heat exchanger and are connected to the evaporator section of a waste-heat boiler of the shaft cooler. Flue-gas passages are formed at the bottom edge of the masonry ring by radially, spaced-apart webs.

15 Claims, 7 Drawing Figures

4,708,196

SHAFT COOLER FOR THE DRY QUENCHING OF COKE

BACKGROUND OF THE INVENTION

This invention relates to a shaft cooler for dry quenching of coke and other fuel pieces, and more particularly, to such a cooler having a vertical refractory chamber with a top conical portion formed with a central charging opening and a substantially cylindrical portion disposed below the top conical portion and having a bottom discharge opening; the interior of the cylindrical portion communicating with a number of flue-gas passages at the bottom part of a ring main which extends around the top part of the cylindrical portion.

In West German patent publication No. 1,471,598, there is disclosed a shaft cooler in which masonry material extends continuously over the entire height of the chamber. In practice, it has been found that the masonry zone in this construction below the flue-gas passages is particularly at risk and, therefore, must be regarded as a weak zone. The main risk is due to the high specific pressure loads because of the weight of the inner masonry disposed above the passages for the flue gas. Collapse of the masonry during operation of the shaft cooler is frequent in these zones which causes unwanted disturbances and downtimes. To reduce the bearing pressure on the support walls near the flue-gas passages, it has been suggested to reduce the weight of the masonry in the conical part of the shaft cooler. Efforts have also been made to divert more of the weight of the bricks in the conical portion to the outer masonry located outside the flue-gas main. However, no satisfactory improvement has yet emerged.

SUMMARY OF THE INVENTION

It is an object of the present invention to obviate the disadvantages described hereinabove.

It is another object of the invention to devise the masonry located above the passages for flue gas in a manner so as to obviate the difficulties associated in the zones of flue-gas passageways of known shaft coolers which arise particularly due to excessive pressures.

It is a further object of the present invention to provide a shaft cooler for coke wherein a coke charge is acted upon to prevent a considerably larger exposed surface before the flue-gas passages as compared with the known constructions of shaft coolers for the purpose of decreasing the velocity of the cooling gas which is delivered by the flue-gas passages and, therefore, provide a decrease to the discharge of coke dust.

More particularly, according to the present invention, there is provided a shaft cooler for dry quenching of coke wherein the cooler includes the combination of a vertical refractory chamber extending along a central vertical axis with a conical top portion having a central coke charging opening and a substantially cylindrical portion below the top portion having a bottom coke discharge opening, a masonry ring suspended by tubular stays against a bottom edge of the top portion of the cooler to extend around a top part of the cylindrical portion, the tubular stays being guided at their upper ends by the top portion and extending parallel to the central vertical axis at an equidistant spacing from one another about the periphery of the masonry ring, retaining means secured to the tubular stays for support on the top edge of the cylindrical portion, and refractory support webs spaced equidistantly from one another and extending radially between the bottom portion of the masonry ring and the cylindrical portion to form flue-gas passages extending upwardly therebetween for conducting the flue-gas.

This construction of the shaft cooler provides substantial advantages, a first of which is that the conventional support or bearing walls which are disposed between the passages for flue-gas and which are very prone to disturbances because of heavy pressure on them can be omitted and replaced by merely providing radial bearing or support webs by which the masonry ring bears on the inside wall of the outer masonry. The radial bearing or support webs do not receive forces arising from the weight of the masonry ring. A further advantage is that the masonry ring, an independent structure, can expand independently, thus obviating thermal stresses on parts of the masonry which, although unitary, are of different thicknesses. Such an independent masonry structure also has advantages when it is necessary to carry out repair operations.

In the conventional design of a shaft cooler, the flue-gas passages are disposed substantially in a plane of the inner wall of the masonry. A conically-shaped portion is sometimes disposed below the inner wall for transition to a cylindrical quenching chamber therebelow. Some of the coke particles penetrate into the flue-gas passages and form an inclined exposed surface therein. The total effective space for the passage of flue-gas becomes relatively small with the result that the cooling gases must issue at a relatively high velocity.

The present invention obviates this disadvantage by providing that the passages for flue-gas, instead of being disposed in the plane of the cylindrical inside wall of the chamber, be disposed between the masonry ring and the outer masonry of the cooler and, thereby, in accordance with a further feature of the present invention, the passages have downwardly-directed inlets disposed substantially in the plane or above the bottom edge of the masonry ring. This relationship enables the coke charge to form an inclined, relatively large, exposed surface at the transition site between the prechamber and the quenching chamber. Pieces of coke can enter such passages from the edge zones.

Thus, the present invention provides that the exposed surface is about 2½ times greater than in a conventional design which provides an approximate 60% reduction in the exit velocity of the cooling gas with a correspondingly decrease discharge of coke dust. This also reduces the adverse effect of coke dust on downstream facilities such as boilers, blowers or the like.

The tubular stays used to suspend the masonry ring can be of various kinds and arranged in various ways, for example, inside or outside the masonry. When the tubular stays extend in the interior of the masonry, the stays are cooled by the flow of a medium such as gas or water through these stays. Conveniently, when the coolant is supplied externally, the tubular stays comprise an outer tube closed at its bottom and an inner tube having a length substantially the same as the outer tube and open at its bottom. The top end of the inner tube serves as an inlet and the top end of the outer tube serves as an outlet for circulating the coolant medium. In this arrangement, the inlets provided by the inner tubes are connected to a ring main for supplying a coolant medium and the outlets provided by the outer tubes are connected to a second ring main for discharging the coolant.

Equally useful is an arrangement wherein the cooling gas derived from the process circuit is used to cool the tubular stays. In this event, the tubular stays again take the form of discrete tubes which are open at their bottoms and merge into an orifice in the masonry. The orifice extends into the interior of the cooling chamber. The cooling gas which is introduced in the stays enters the interior of the shaft cooler in the zones of the orifices to mix with the cooling gas which flows upwardly along the chamber for the cooling process.

The upper ends of the tubular stays are secured in suitable retaining means to transmit the weight loading on the stays to the upper edge of the outside masonry of the shaft cooler. In a shaft cooler wherein a metal hood extends externally around the top conical portion of the cooler and the hood is connected at its bottom edge to a support plate, the retaining means are conveniently embodied as a vertical tubular support disposed in a recess in the hood for each individual tubular stay. The tubular support is secured to the hood, preferably by welding. Each tubular support receives the top end of a tubular stay which has a welded collar on its wall to engage with the exposed end of the tubular support. Conveniently, the retaining means can be further strengthened by ribs. Such ribs are disposed inside the hood and extend from the inner wall thereof vertically downwardly to the bearing plate where the ribs are welded to the hood, to the tubular support and to the bearing plate.

According to another feature of the present invention, projections such as annular discs or the like, are secured, preferably by welding, to the bottom ends of the tubular stays. Projections of this type help to tie the stays to the masonry and thus improve the transfer of the weight load to the stays.

The masonry ring can be suspended by means of tubular stays which extend along the outside wall of the masonry instead of the inner wall of the masonry. Conveniently, in this event, the tubular stays are connected along their entire length by webs to form a closed steel ring. A tube wall of this kind is knwon in the boiler art as a finned tube wall in which the tubes form boiler tubes which are interconnected by webs and are connected at each of their ends to a respective ring tube.

In the case of a steel ring which extends around the masonry ring according to the present invention, a main or collector in the form of a ring tube is welded to one end of each individual tube so that the interiors of all the discrete tubes communicate with one another by way of tube ends. Conveniently, the bottom ring tube is embedded in a ring of shaped bricks which serves as a bearing support for the masonry thereabove. In this design, the masonry above the bricks can be constructed of conventional radial bricks. Shaped bricks are required only for the bottom ring in which the bottom ring tube of the steel ring is embedded. The bottom ring tube can have horizontal projections that are interrupted or continuous to increase the area of engagement.

The steel ring in the conical top portion of the shaft cooler is retained in exactly the same manner as in the construction of the shaft cooler originally described. To this end, upwardly-extending tubular stays can be welded to the top ring tube to serve as risers which are supported or carried in the manner hereinbefore described in regard to the tubular support members of the metal hood associated with the conical portion.

Advantageously, the closed tube wall can be incorporated as a heat exchanger in the evaporator section of the shaft cooler waste-heat boiler. In this event, at least one connection facility is provided for a feed water line on the bottom ring main. The risers are directly connected to the evaporator section of the waste-heat boiler. Some of the heat of the hot gases rising in the ring main is transferred to the tube wall and thus provides energy for the production of steam. The temperature of the hot gases is reduced by about 30° C.–60° C. The volume of the hot gas is, therefore, also reduced which is advantageous because subsequent facilities can be correspondingly smaller.

The arrangement of an external tube wall provides the additional advantage that the closed steel ring provides a bearing support for the internal masonry against the pressure due to the coke charge inside the prechamber. Also, the external tube wall improves insulation of the prechamber such that the function of the prechamber as a heat accumulator to compensate for variations in the operation is completely unaffected.

These features and advantages of the present invention as well as others will be more fully understood when the following description is read in light of the accompanying drawings, in which.

Figure 1:
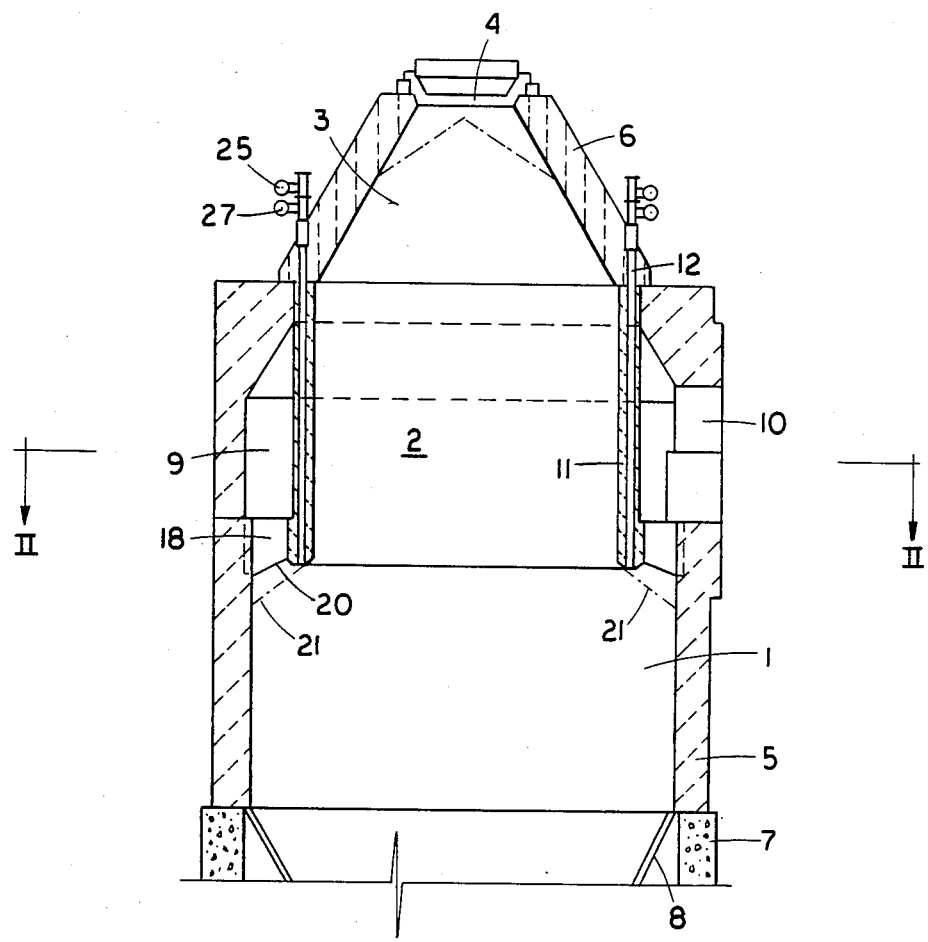
FIG. 1 is an elevational view, in section, of a shaft cooler embodying a masonry ring suspended by inner tubular stays according to one embodiment of the present invention.
Figure 6:
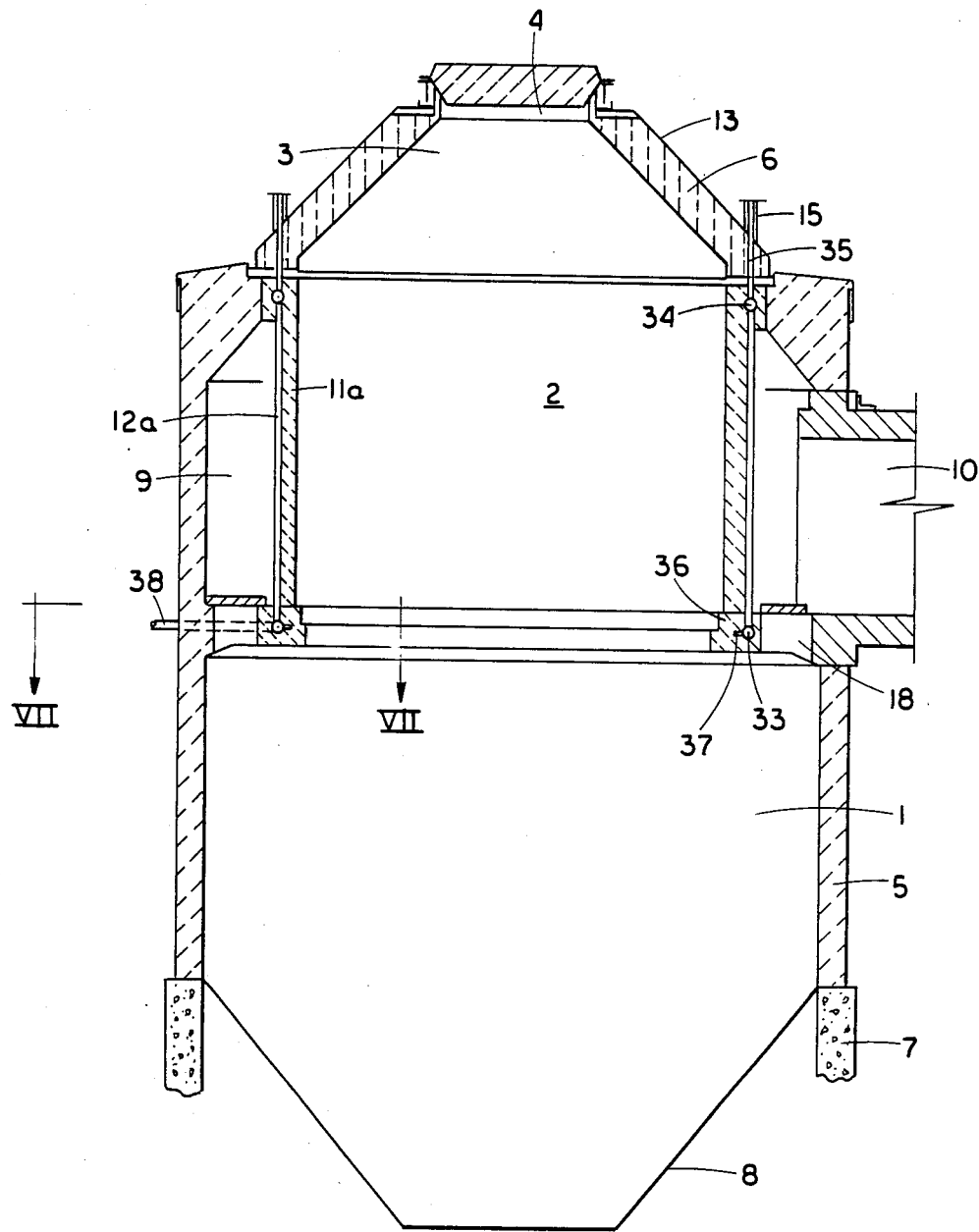
FIG. 6 is an elevational view, in section, of a shaft cooler similar to FIG. 1 but illustrating an arrangement for support of the masonry ring by a tube wall near the prechamber of the shaft cooler.

In the embodiments of the present invention shown in FIGS. 1 and 6, an upright, substantially cylindrical shaft cooler includes a cooling chamber 1 at the bottom of the cooler and a prechamber 2 above the cooling chamber. A conical portion 3 is disposed above the prechamber 2 and formed with a central charging opening 4. Refractory bricks are used to form wall 5 of the cylindrical part and wall 6 of the conical portion of the shaft cooler. A foundation ring 7 supports wall 5. At the bottom end of the cooling chamber, there is a funnel 8 which merges into a discharge opening, not shown, for delivery of coke after cooling in the shaft cooler. Cooling gas enters the interior of the shaft cooler by a line connected to the bottom of the funnel 8.

A ring main 9 communicates with an exit orifice 10 in the periphery of the main 9 in the masonry of wall 5 at an elevation of the prechamber 2. A masonry ring 11 forms an inner boundary of the ring main 9. The masonry ring 11 is an independent structure suspended by means of a large number of tubular stays 12.

Figure 3:
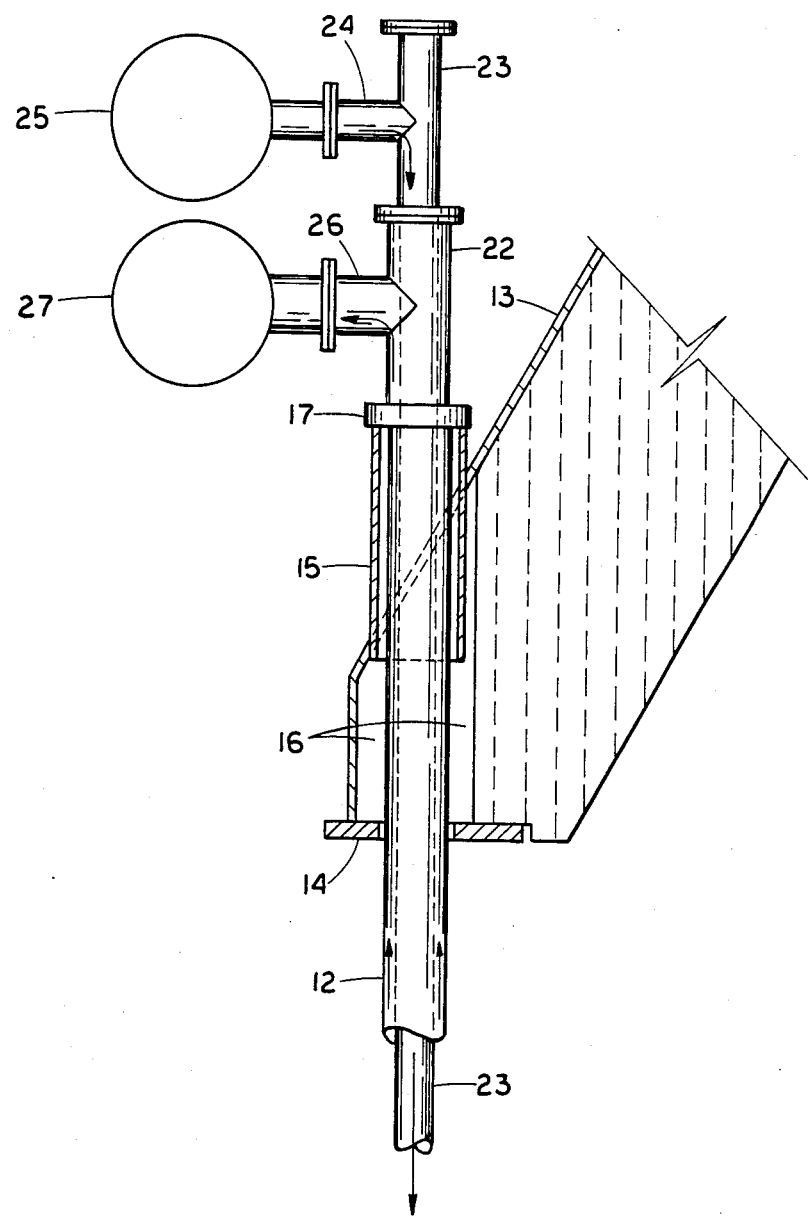
FIG. 3 is an enlarged view, partly in section, illustrating the upper part of tube anchors for carrying the masonry ring as shown in FIG. 1.

In the embodiment of the shaft cooler shown in FIG. 1, the stays 12 extend inside the masonry ring 11 at an equidistant spacing from one another about the entire periphery of the masonry ring 11. The stays bear at their top ends by way of retaining means on the outside masonry of wall 5. The retaining means are illustrated in FIG. 3 and as shown therein, a conical metal hood 13 extends over the outside of wall 6 of the conical portion 3. The bottom edge of the hood 13 is secured by welding to a bearing plate 14 supported on the top end face of wall 5. A vertical support member 15 is disposed in a recess in hood 13 and secured rigidly thereto by welding. Disposed inside the hood 13, in addition to support members 15, are radially-strengthening or reinforcing ribs 16 welded to hood 13 and plate 14.

Figure 2:
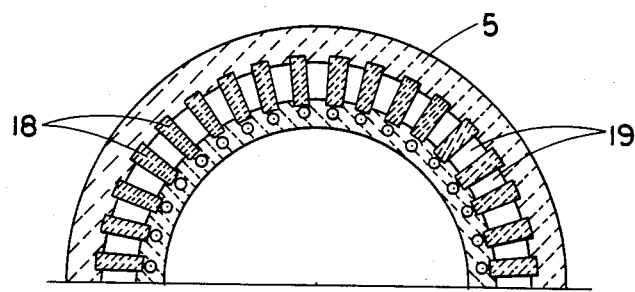
FIG. 2 is a sectional view taken along line II—II of FIG. 1.

Each individual support member 15 is adapted to receive a tubular stay 12 which is provided with a collar 17 engaged with the upper surface of the support member 15 as shown in FIG. 2. The tubular stay extends freely, i.e., without connection to other parts through which the stay extends, as far as the masonry ring 11 therebelow. The tubular stays are, therefore, subject to tension loads and transfer the weight of the masonry ring 11 by way of collar 17 to hood 13 and thence by way of plate 14 to the outside masonry of the shaft cooler.

The bottom end of the masonry ring 11 bears on wall 5 by way of radial webs 18 that are spaced, equidistantly, apart from one another about the entire periphery of the ring. The openings between the webs 18 form passageways 19 through which gas can enter the ring main 9 thereabove. The flow area, in cross section, of the passageways 19 can be varied by register bricks. In the embodiment shown, the width of the open cross sections of each passageway 19 in the peripheral direction corresponds approximately to the thickness of a web 18, as best shown in FIG. 2. The webs 18 are made of refractory bricks which are also used for the remainder of the masonry. A bottom boundary edge 20 of the webs 18 has a shape which is inclined from the inside of the vessel toward the outside and corresponds substantially to the contour line of a coke charge identified by the reference numeral 21 and shown on both sides of the vessel by phantom lines in FIG. 1. By this arrangement, the descending coke does not contact the bottom edges of webs 18.

Figures 4, 5:
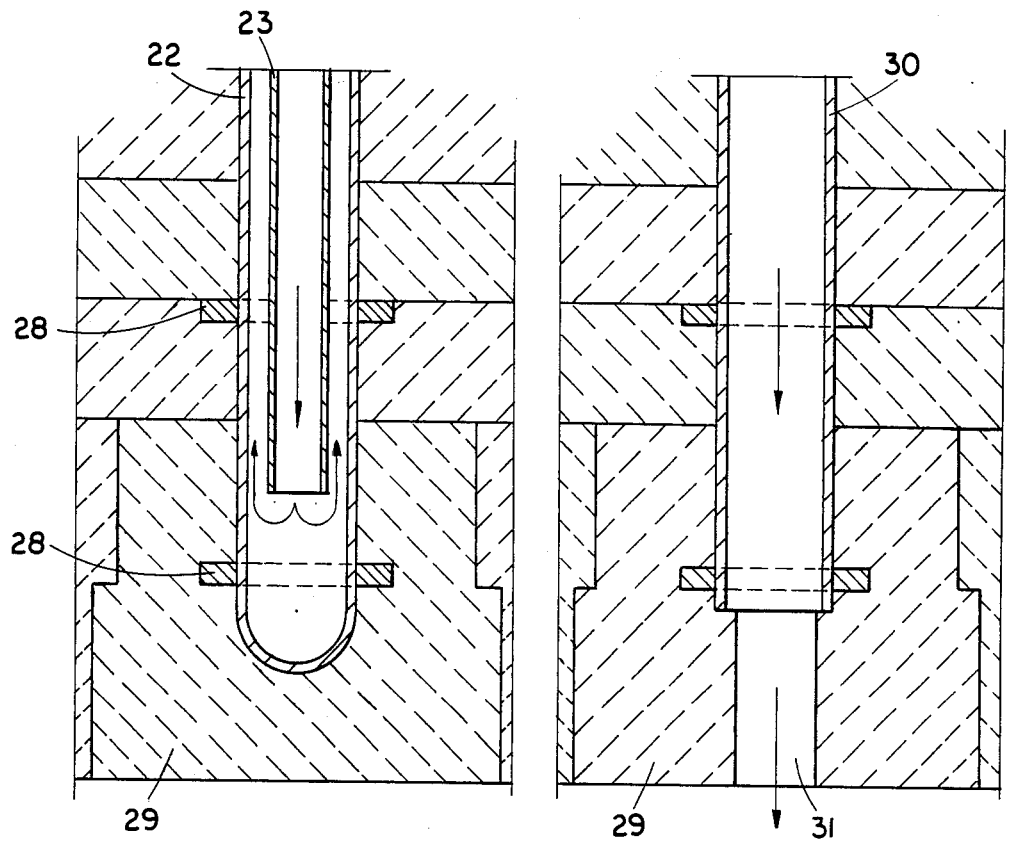
FIG. 4 is an enlarged elevational view through a lower portion of the tubular support and inner tube.
FIG. 5 is an enlarged view similar to FIG. 4 but illustrating a further embodiment of tubular stays having an opening at the bottom of the support tube.

FIGS. 4 and 5 illustrate in greater detail two embodiments of the bottom end portions of the tubular stays 12. In the embodiment shown in FIG. 4, a tubular stay is made up of an outer tube 22 closed at its bottom end and within this tube there is received an inner tube 23 having an open bottom. The opposite end of the inner tube 23 is joined outside the hood 13 as shown in FIG. 3 by way of a connection 24 with a ring main 25 for supplying cooling gas. Another connection 26 communicates with the annular chamber between the inner tube 23 and the outer tube 22. Connection 26 is connected to a ring main 27 for the discharge of cooling gas.

Referring, again, to FIG. 4, two annular discs 28 are secured to the bottom end of the outer tube 22. The discs are positively embedded in various layers of the masonry ring 11. The bottom end of tube 22 terminates in a unitary refractory member 29.

FIG. 5 illustrates a further embodiment of the tubular stays and particularly the lower end portion in which each tubular stay comprises a single tube 30 which is open at its bottom end and communicates by a bore 31 in the bottom closure member 29 with the interior of the shaft cooler. In this arrangement, the stays 30 are cooled by a small amount of cooling gas which is derived from the process circuit and enters the interior of the shaft cooler at the bottom end of the masonry ring 11 where the gas is mixed with cooling gas supplied upwardly for the coke-cooling process.

Figure 7:
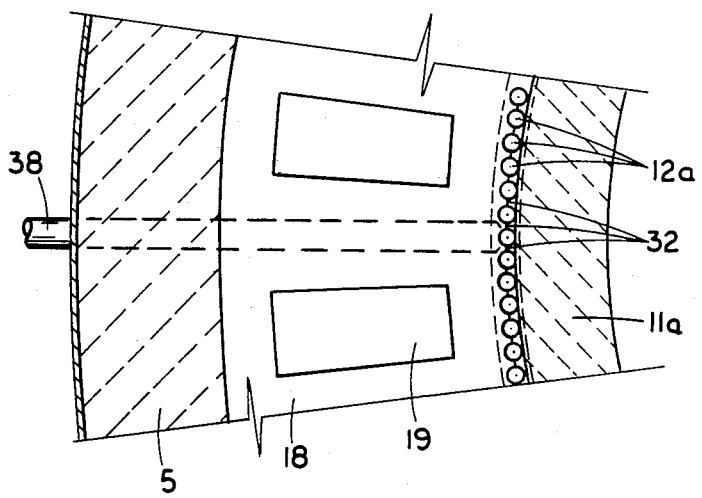
FIG. 7 is an enlarged sectional view taken along line VII—VII of FIG. 6.

A further embodiment of the shaft cooler is illustrated in FIGS. 6 and 7 which is basically similar to the construction of the shaft cooler described hereinbefore and like parts bear the same reference numerals. One difference of the embodiment shown in FIGS. 6 and 7 from the previous embodiment is that there is provided a masonry ring 11a which is suspended on outer tubular stays. These stays take the form of closely-adjacent tubes 12a with webs 32 extending between the tubes over their entire length and interconnecting the tubes to form a closed steel ring. The bottom and top ends of the tubes 12a are welded to ring tubes 33 and 34, respectively. Apertures are provided in the ring tubes 33 and 34 at places where the tubes 12a are joined to the ring tube so that the interiors of all the tubes 12a communicate at their ends with the ring tubes 33 and 34 which, therefore, can be regarded as collectors.

Individual tubes 35 are arranged upright and welded to the top of ring tube 34. The tubes 35 are distributed about the entire periphery in an equidistant relation from one another, thereby forming elongated tubular stays. The tubes 35 are connected by way of retaining means on the outer masonry of wall 5 in the same manner as described hereinbefore and shown in FIG. 3.

A ring 36 is disposed on the bottom end of the masonry ring 11a. Ring 36 is made up of shaped bricks and ring tube 33 is embedded in ring 36. The ring tube has secured to it, for example by welding, a projection in the form of a ring flange 37 to increase the area by which the weight load can be transferred. The bottom ring 36 in this embodiment forms a bearing member for the masonry ring 11a above. The top end of the masonry ring 11a merges into a widened, outwardly-extending portion in which the top ring tube 34 is embedded.

The closed steel ring formed by tubes 12a, 33 and 34 can readily serve as a heat exchanger in the evaporator section of the waste-heat boiler of the shaft cooler. At least one connecting tube 38 is provided on the bottom ring tube 33. All that is necessary to connect the heat exchanger to the evaporator section of the waste-heat boiler is a prolongation of tubes 35 to form risers which will be connected to the evaporator section. When only some of the tubes 35 are required to form risers, other of the tubes 35 are embodied as blind tubes and used solely to transmit the weight to the retaining means as hereinbefore described.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A shaft cooler for dry quenching of coke, said cooler including the combination of:
   a vertical refractory chamber extending along a central vertical axis with a conical top portion having a central coke charging opening, a substantially cylindrical portion below said conical top portion and extending to a bottom coke discharge opening;
   a masonry ring suspended by tubular stays against a bottom edge of said conical top portion to extend around a top part of said cylindrical portion, said tubular stays attached at their upper ends to said top portion and extending parallel to said central vertical axis at an equidistant spacing from one another about the periphery of said ring;

manifolding means for providing coolant to said tubular stays;

retaining means secured to said tubular stays to retain said masonry ring; and refractory support webs spaced equidistantly from one another and extending radially between the bottom portion of said masonry ring and said cylindrical portion to form flue passages extending upwardly therebetween for conducting flue-gas.

2. The shaft cooler according to claim 1 wherein said refractory support webs define entry passages therebetween for flue-gas said entry passages being substantially in the plane defined by the bottom portion of said masonry ring.

3. The shaft cooler according to claim 1 wherein said refractory support webs define entry passages therebetween for flue-gas said entry passages being positioned above the bottom edge of said masonry ring.

4. The shaft cooler according to claim 1 wherein said retaining means includes an external metal hood extending around said conical top portion, a support plate secured to a bottom edge of said external metal hood, tubular support members arranged vertically in recesses in said external metal hood and secured thereto for receiving and retaining said tubular stays, and an outer collar on each exposed end of said tubular support members for engaging a stay of said tubular stays.

5. The shaft cooler according to claim 4 wherein said retaining means further includes strengthening ribs secured to and extending between an inside wall of said external metal hood, said tubular support members and said support plate.

6. The shaft cooler according to claim 1 further including means secured to the bottom ends of said tubular stays for engaging and supporting said tubular stays in masonry forming part of said substantially cylindrical portion.

7. The shaft cooler according to claim 1 wherein said tubular stays each includes an outer tube having a lower closed end for discharging a coolant medium, and an inner tube having a length which is substantially the same as the length of said outer tube and having an opening at its lower end for supplying the coolant medium.

8. The shaft cooler according to claim 7 further including a supply ring main coupled to an upper end of each inner tube for supplying the coolant medium, and a discharge ring tube coupled to an upper end of each outer tube for discharging the coolant medium.

9. The shaft cooler according to claim 1 wherein said tubular stays each includes a bottom portion having an opening extending into an orifice in masonry of said masonry ring which orifice is extended to said vertical refractory chamber.

10. The shaft cooler according to claim 1 wherein each of said tubular stays contacts an outer wall of said masonry ring.

11. The shaft cooler according to claim 10 wherein said tubular stays are closely spaced together and interconnected along their lengths by webs to form a closed steel ring, a ring tube secured to conduct fluid to the upper ends of said stays, a ring tube secured to conduct fluid from the lower ends of said stays, and retaining means for supporting said upper ring tube from the top edge of said cylindrical portion.

12. The shaft cooler according to claim 11 further including a refractory brick ring at the bottom termination of said masonry ring with said refractory brick ring tying together said lower ring tube and the ends of said tubular stays.

13. The shaft cooler according to claim 12 wherein said lower ring tube includes horizontal projections extending therefrom in a discontinuous fashion.

14. The shaft cooler according to claim 11 wherein said lower ring tube include horizontal projections extending therefrom in a continuous fashion.

15. The shaft cooler according to claim 11 wherein said upper steel ring includes a heat exchanger in a cooling circuit for the shaft cooler, said shaft cooler further including at least one spigot coupled to the bottom ring tube, and means for connecting said tubular stays at said top ring to an evaporatory section of a waste-heat boiler.

* * * * *